United States Patent Office 2,727,816
Patented Dec. 20, 1955

2,727,816

METHOD FOR REDUCTION-SMELTING OF FERROUS MATERIALS IN A MODIFIED BLAST FURNACE WITH A SPECIFIC COMBINATION OF GASEOUS INJECTION AT TWO LEVELS

Julien Raick, Brussels, Belgium

No Drawing. Application October 3, 1952,
Serial No. 313,037

8 Claims. (Cl. 75—42)

This invention relates to a method of operating blast furnaces and has particular reference to specific and calculable methods of utilizing hydrocarbon materials as the source of part of the heat and reducing power required for smelting iron or other metallic oxides.

In conventional blast furnace operation, the reduction of iron oxides is most economically effected by the so-called "indirect" reduction by CO at gas-solid interface temperatures below about 1000° C. in the upper part of the shaft. This reduction can be expressed by the following equation:

(1)        $Fe_2O_3 + 3CO = 2Fe + 3CO_2$

Lower down in the shaft, where the temperatures are higher, this reaction cannot take place because the gaseous product of the reaction, i. e. $CO_2$, tends to disappear in the presence of the carbon in the incandescent coke. This phenomenon is ordinarily referred to as "solution loss" and can be expressed by the following equation:

(2)        $3CO_2 + 3C = 6CO$

Complete reduction of the ore is never completed in the low-temperature zone in the upper part of the shaft, because with the given temperatures and gas compositions the reaction time is long compared with the residence time of the descending materials. The remainder of the iron ore, i. e. up to about 40%, is later reduced by so-called "direct reduction" at high temperatures in the lower part of the shaft. This reduction can be expressed by the following formula:

(3)        $Fe_2O_3 + 3C = Fe_2 + 3CO$

It can be regarded as occurring either by a combination of Equations 1+2, or by Equation 3. Since Equations 1+2 added together produce Equation 3, these methods are thermally equivalent.

(1) $Fe_2O_3 + 3CO = 2Fe + 3CO_2$ indirect reduction
(2) $3CO_2 + 3C = 6CO$                solution loss
---
(3) $Fe_2O_3 + 3C = 2Fe + 3CO$        direct reduction If the portion of the iron ore presently reduced by "direct reduction" were to be subjected to reduction by simple gaseous agents in a manner less wasteful of heat, the coke consumption would be greatly decreased and the production increased. All the iron oxides would then be reduced at lower temperatures, and the only iron remaining oxidized would be the iron in the coke ash and the iron combined with silicates, altogether comprising about 20 lbs. per short ton, or 1% of the iron, in the succeeding illustrative case.

Hydrogen is superior to CO as a reducing agent in the lower part of the shaft since at the temperatures existing there the equilibrium ratios $H_2O/H_2$ are greater than the ratios $CO_2/CO$, so that for given initial gas compositions a higher driving force exists in the case of $H_2$. This is the region in which most of the direct reduction of ferrous oxide takes place so that the introduction of a reducing potential into this region would cause the more economical reaction with hydrogen to replace the less economical reaction with carbon. I have discovered that the reaction rate with $H_2$ is greater than that with CO even in the lower temperature range, so that the advantage of $H_2$ over CO is manifest throughout the region of gas-solid contact in the shaft. The problems of channeling and of penetration of the iron ore particles indicate that an injection process can only be economical when the fast rate of reduction by $H_2$ at high temperatures is made use of, and this is only accomplished by injection of high temperature gas in the so-called "critical zone," hereinafter defined.

Many of the processes taking place in the blast furnace, such as, for example, the reduction of iron oxide with CO, or the calcination of limestone, must go to completion within a certain temperature range if the furnace is to operate economically. For instance, if the reduction of iron is not complete within the temperature range at which $CO_2$ can exist at equilibrium, it must be uneconomically completed with the consumption of solid carbon at higher temperature levels. Such time-consuming processes all take place beneath the temperature of fusion of the slag-forming materials and the region characterized by these processes is hereby defined as the preparation zone. In the lower zone of the furnace where the temperature is higher than the slag-forming temperature, take place the melting of the slag and the superheating of the iron and slag, together with direct reduction of oxides of manganese, silicon, and phosphorus, and of the iron oxide in the coke ash. The economical rate of heating of the materials above this temperature is therefore faster than it is in the preparation zone. Injection of gases into the critical zone increases the reducing action in the preparation zone so as to keep pace with the heating action, thus preventing the uneconomical creation of reducing power at the expense of a large quantity of fuel, as occurs in present blast furnaces for example according to Reaction 2. To provide the maximum contact area over which such reducing action can be effective, the gas should be injected into the furnace in a region below that in which the time-consuming reactions normally occur, and into a temperature zone such that reduction will be substantially complete. Such a region is termed the critical zone, and it corresponds to a zone of gas-solid interface temperatures between about 1150° C. and 1400° C. It is not precisely fixed in the shaft dimensionwise, but its location is near the mantle. The melting zone is accordingly that region where the time-consuming reactions and the fusion of the slag are complete. It should be borne in mind in considering blast furnace phenomena that the blast furnace process is essentially a countercurrent one involving the interaction of two continuously moving streams. The descending stream is charged into the top of the furnace in the solid state and comprises ore, fuel and flux, intermixed or interspersed. Usually the ore is in the form of iron oxide, physically and chemically pre-treated from the natural state to minimize undesirable impurities such as sulfur and to obtain an optimum particle size large enough to minimize dusting and small enough to promote the reactions within the furance and to minimize channeling and clogging in the shaft. The fuel is in the form of suitably comminuted high-grade coke. The flux is in the form of suitably comminuted limestone. The details of the preparation of these solid materials is well-known and what is considered the highest quality preparation under conventional practice would be the most desirable for use in my process. Indeed it is one of the advantages of my invention that it extracts the maximum benefit from such high-standard preparation. The ascending stream is composed of gases and originates with the hot hearth blast. It acquires combustion products from the burning of fuel at the tuyeres and reaction products from the reduction of the ore. The upper limit of the critical zone in the shaft is that above which the critical temperature—i. e. the temperature of slag formation does not exist. In a well-designed and properly operated blast furnace, this zone will not rise above, and is usually decidedly below the mantle. Below the critical zone is the melting zone—the region of maximum temperature immediately above the hearth tuyeres where the combustion of solid carbon in the blast stream takes place—and above the critical zone is the preparation zone—the region in which the slag forming elements are heated to critical temperatures as they descend and the predominant part of the ore reduction takes place.

It is the distinguishing feature of my process that I control or modify the ascending gas stream of the classic countercurrent blast furnace process physically or chemically or both at the hearth tuyere level and again at the critical zone, the operations at both levels being pre-calculated to accord and not clash with the optimum equilibrium values through the essentially continuous operation. These control procedures are not only effective to increase the capacity of a furnace operating at conventional top pressures—i. e., ¼ atmosphere gauge—but are virtually essential to obtaining any economic benefit from operating, as already proposed, at elevated top pressures—i. e., up to 2½ atmospheres gauge.

When a countercurrent system of heat exchange exists between an initially cold stream of solids and an initially hot stream of gases, the only possible form of heat transfer is from gases to solids. Thus, a certain excess temperature of the gases over the solids must exist in order to maintain the transfer of heat and the proper melting speed. This difference is greater at maximum driving rates on large modern furnaces than it is on small furnaces or furnaces with insufficient blowing capacity. In the critical zone it should amount to at least 150° C., and it will be still greater in the melting zone. Any injection of gases which does not take into account this necessary difference between gas phase temperatures and gas-solid interface temperatures produces uneconomical operation of the furnace and causes temporary cessation of heat exchange, even, in some cases, stopping of the furnace. Therefore, it is impossible to inject solids or gases into the furnace at temperatures appreciably lower than the surrounding gas temperatures. To reach these high temperatures, commercial methods of preheating are not adequate, and it is necessary to use hydrocarbon materials from which additional heat can be obtained by the process of oxygen reforming. Here and in succeeding paragraphs, the word "reforming" refers to the combined cracking and partial oxidation of the carbon content of hydrocarbon materials to produce CO and $H_2$ with substantially no $CO_2$ and $H_2O$, while the term "oxygen-reforming" refers to reforming with oxygen-enriched air or with substantially pure oxygen. It is emphasized that there is no way of economically injecting gases into the critical zone at a temperature 150° C. above the solid temperatures unless hydrocarbon materials such as natural or refinery gases, fuel oils, synthetic hydrocarbons from coal, or the like are used, and unless these materials are reformed with substantially pure oxygen. The necessity for oxygen-reforming will be further demonstrated below by considerations of a maximum permissible top gas volume for a furnace of given capacity.

In accordance with the present invention, preheated hydrocarbon materials are reformed with cold or preheated oxygen, and the resulting reformed gasses, containing very little $CO_2$ or $H_2O$, are introduced into the blast furnace in the critical zone. This injection is preferably but not necessarily accompanied by oxygen enrichment of the blast entering the hearth, the advantages of which will presently be described.

In view of the aforementioned gas-solid temperature differential required in the proper operation of a blast furnace and the consequent requirement for efficiency that gases injected into the critical zone be at high temperature, the availability of fuels for additives is virtually limited to hydrocarbon materials such as natural and refinery gases, fuel oils, synthetic hydrocarbons from coal and the like, which can be so treated by oxygen reformation with or without preheating as to yield an injecting gas consisting of CO+$H_2$ with little or no $CO_2$ and $H_2O$ and inert gases such as $N_2$ in as small amounts as the purity of the reforming oxygen will permit. The use of water gas and coke oven gas is excluded, since these gases cannot by present commercial methods be raised to the correct temperature, namely in the range of about 1200° C. to about 1600° C. Such processes as the injection of water or coke oven gas, lime or pulverized coal into the tuyeres are seen to be entirely uneconomical, since they act to lower the excess temperature of gases over solids, and bring about a cessation of heat transmission from gases to solids and slow or stop the furnace.

The saving in coke consumption which is due directly to a decrease in carbon consumption calculated from Equation 3 amounts to about 4%. But this does not take into account the further saving realized from the decreased heat requirement in the preparation zone due to eliminating the endothermic heat requirement of Equation 3. This further saving amounts to about 15% of the total heat requirement of the preparation zone even without taking into account the consequent reduction in heat losses by convection and radiation. Neither does it take into account the still further saving which results from the greatly decreased amount of carbon which had to be heated during its passage through the preparation zone towards the tuyeres to cover the requirements now eliminated; this still further saving amounts to about 7% of the preparation zone requirements.

According to this invention, the volume of reformed gas is regulated to eliminate or greatly decrease the amount of carbon consumed in the stack in actual or virtual direct reduction according to Equation 3. The total saving in coke consumption in an illustrative case is 27%, and in other cases, for example with pressure operation, it is much higher.

The above-mentioned savings per ton of hot metal do not include the saving in capital investment due to the increased tonnage of hot metal produced per unit of time as a result of the conjunction of a lower ratio of carbon burned at the tuyeres per ton of hot metal and a steady rate of carbon consumption at the tuyeres per unit of time.

A better understanding of the overall effect of reformed gas injection accompanied by oxygen-enrichment of the blast on production as well as on economy will be furnished from the following example showing results of calculations performed for a large American blast furnace operating with the injection of oxygen-reformed natural gas and oxygen-enriched blast, but under normal pressures. Under prior normal operations the furnace produced 1239 short tons of pig iron per day and consumed 1890 lbs. of coke per short tons of pig iron produced. The blast contained 22% oxygen by volume and the blast volume was 73,600 cubic feet per minute. Had this furnace been operated according to the present invention the production would have been 1933 short tons of pig iron per day at a coke consumption of 1106 lbs. per short ton of pig iron produced. To accomplish the blast would have been enriched to contain 31.5% oxygen by volume, while the blast volume was decreased to 51,300 cubic feet per minute. Additionally 7440 cubic feet per minute of natural gas would have to be reformed with oxygen of 93% purity and the oxygen-reformed hydrocarbon materials injected into the critical zone. Total oxygen consumed would amount to 586 tons a day.

The heat balance of the preparation zone with oxygen-reformed natural gas injection is as follows:

*Heat requirements*

| | Kcal. above absolute zero (−273° C.) |
|---|---|
| Processing of carbon | 365,000 |
| Processing of metal | 252,000 |
| Processing of slag | 279,000 |
| Heat losses in the top gases | 503,000 |
| Losses from the furnace | +76,000 |
| | [1] 1,475,000 |

[1] Kcal./metric ton pig iron.

*Heat supplied*

| | |
|---|---|
| Heat supplied by combustion gas | 1,120,000 |
| Heat supplied by reformed gas | +324,000 |
| | [1] 1,444,000 |

[1] Kcal./metric ton pig iron.

The heat balance of the melting zone is as follows:

*Heat requirements*

| | Kcal. above 1350° C. |
|---|---|
| Endothermic reduction reactions | 108,000 |
| Superheating the pig iron | 22,500 |
| Processing the slag | +85,700 |
| Useful heat consumption | 216,200 |
| Losses | +225,800 |
| Total heat consumption | [1] 442,000 |

[1] Kcal./metric ton pig iron.

*Heat supplied*

At a blast temperature of 830° C. the heat available to the melting zone above the critical temperature (1350° C.) is 442,000 kilocalories.

The following figures show the results which may be expected on the same blast furnace operating with injection of the product of oxygen-reformation of preheated fuel oil and the same degree of oxygen-enrichment of the blast:

Production—2625 short tons of pig iron (hot metal/day).
Coke consumption—871 lbs./short ton of pig iron.
Blast volume—55,000 cubic feet per minute.
Oil consumption—400 lbs. Bunker C/short ton of pig iron.
Total oxygen consumption—877 short tons/day.

Gas injection in the critical zone may be used by itself, without oxygen enrichment of the blast, with an appreciable economy in coke and increase in production due to a decrease in the amount of direct reduction, Equation 3, or in solution loss of carbon, Equation 2. But a limit to gas injection is generally reached when the top gas volume becomes so great as to carry appreciable quantities of dust out of the furnace, and when the quantity of heat delivered to the preparation zone by both combustion and injection gases becomes excessive, causing the top temperature, and consequently the coke consumption, to rise. It is clear that the great increase in production indicated by the above calculation is only obtained in practice when the blast is enriched with oxygen. The effect of this blast enrichment is to decrease the top gas volume and top temperature, and consequently to permit the use of greater quantities of oxygen-reformed hydrocarbon materials without excessive flue dust losses. When both critical zone reformed gas injection and oxygen enrichment of the blast are used, the true limit to the productivity of the furnace is the rate of certain reactions in the preparation zone. The reactivity of the gases having already been increased to its maximum by injection of hydrogen at the correct temperature level, the reaction rates can only be increased by proper conditioning of the materials of the charge, and this becomes more important as the quantity of coke in the furnace is decreased, since the coke is the least dense material making up the charge and the most permeable to the flow of gases.

The above illustrative example does not take into account a supposed faster rate of oxidation of carbon in the hearth accompanying oxygen enrichment of the blast. The rate of oxidation of carbon within the tuyeres is limited by the rate at which the coke and other materials are able to descend through the preparation zone, which in turn depends on the rate of the time-consuming reactions mentioned above. To prevent too fast a rate of carbon combustion, oxygen enrichment of the blast should be compensated by decreasing the total blast volume entering the hearth, so that the amount of oxygen entering the hearth per unit of time remains the same as in conventional operation while the amount of nitrogen entering the hearth per unit of time is decreased. The calculated example shows a decrease in total blast volume of 30%.

The decrease in the volume of combustion gases rising from the tuyeres and occurring when the blast is enriched with oxygen, relieves the upward pressure on the materials in the bosh, which is one of the major contributing causes to hanging and sticking. Due to the pasty condition of part of the charge around the top of the bosh, a region of high resistance to the passage of gas always exists here. In the process of the present invention, the decreased volume of combustion gases reduces the possibility of building up dangerous pressures, while the oxygen enrichment increases the temperature gradient and the melting rate and causes shrinkage of the high temperature region in which these troubles may occur.

Although the results of the calculations were obtained without assuming any increase in top pressure, the method of this invention is not limited to operation at normal pressures. As is well known in the art, the conversion of $H_2$ to $H_2O$ and CO to $CO_2$ would increase with increasing top pressures, so that smaller quantities of reformed natural gas and also of oxygen would be required to decrease the amount of solution loss of carbon.

In conventional furnaces producing other types of iron than ferro-alloys, the heat supplied to the preparation zone is derived principally from the gas passing into it from the melting zone. Consequently, the quantity of this heat supplied depends principally upon the volume of that gas and is readily subject to regulation by regulating that volume. The minimum coke consumption is therefore determined by that necessary to produce that gas volume which conveys sufficient heat to meet the minimum heat requirements of the preparation zone. This quantity of coke is never sufficient to meet the high temperature requirements of the melting zone as well and the additional heat required should be introduced as sensible heat of the blast. Moreover, in ferro-alloy practice the heat requirements of the melting zone are increased by endothermic reactions in the hearth, so that the blast furnace stoves can no longer supply preheated air at sufficient temperatures to meet this requirement. Consequently the coke consumption has to be raised above its minimum and most economical value. This increase in coke consumption causes an excess of heat to be delivered to the preparation zone and increases the top temperature. Since the heat delivered to the preparation zone must be delivered between the top temperature and the critical temperature, the increase in top temperature causes a smaller amount of heat to be delivered per unit of carbon burned, and hence decreases the efficiency of the preparation zone, and consequently of the furnace. It has been thought possible to overcome this difficulty by oxygen injection into the melting zone, since oxygen injection applies an increasing proportion of the total heat to the melting zone where the heat requirements are high, and a decreased proportion to the preparation zone, where the requirements are about the same as in normal practice. That conclusion has neglected the fact that oxygen enrichment decreases the gas volume, and consequently also decreases the amount of heat delivered in the preparation zone per unit of carbon burned, in the same manner as occurs with an increase in top temperature. It is easily seen that with the method of gas injection of the present invention, the preparation zone is independent of the melting zone, so that, despite the introduction of oxygen in the blast, an adequate heat supply is insured to the preparation zone by reformed gas injection. Accordingly, and for the above reasons, the method of this invention is recommended for ferro-alloy practice.

The proportions of gas injected in the critical zone and of combustion gas arising from the tuyeres can be regulated to suit the requirements of the burden. If more reducing power is required, as when the burden is rich, more gas is injected, and if more heat is required, more combustion gas shall be produced, this gas having a higher specific heat per unit of volume.

In the reduction process occurring in the preparation zone, there is a progressive increase in the ratio $CO_2/CO$, beginning in the zone at about 1200° C., and reaching a value of 38%/62% in the zone at about 240° C. To prevent reoxidation of iron or solution loss of carbon, with the corresponding loss of heat, any gas injected into the preparation zone must be of such composition that, at the injection temperature, the $CO_2/CO$ ratio is less than or equal to the dynamic equilibrium ratio proper to that temperature. Therefore, the injection into the critical zone must be performed in such a manner that complete combustion does not occur, and is best accomplished by using cracked and oxygen-reformed hydrocarbon materials. This accomplishes the substitution of a large part of the carbon of the coke by a hydrocarbon or mixture of hydrocarbon gases of rank equal or higher than methane, and containing the lowest possible percentage of inerts and of $CO_2$ gas and the highest possible percentage of hydrogen.

The following operations preferably form steps in the overall process using natural gas:

(1) *Preheating the gas in regenerators or heat exchangers.*—The temperature to be obtained must be such that the succeeding partial combustion by oxygen, i. e., the partial combustion of the carbon alone into CO, will raise the final gas temperature to the level specified under (3), below. Such preheating also involves a partial disassociation of the hydrocarbon gases, so that a high velocity of the original gas in the exchangers and bustle pipe should be provided in order to avoid carbon deposition. The preheating temperature of the gases will be highest for methane reaching 725° C. for an injection temperature of 1550° C. but if both oxygen and methane are preheated, a preheat temperature of 300° C. will suffice for the same injection temperature.

(2) *Cracking the preheated natural gas.*—There is simultaneous partial combustion to CO of the carbon in the cracked gas to form a gas mixture, $mCO+nH_2$. The effiiency of the CO reaction will normally exceed 99% even in the absence of a catalyst, and the yield of $CO_2$ will be less than 1%. The oxygen supplied will be approximately the theoretical quantity and will preferably be injected into the preheated natural gas through pipes of small diameter made advantageously of fused silica, and disposed around and parallel to the axis of the blast tuyeres. The oxygen must have a higher pressure and velocity than the gases and the combustion should be completed closely in front of the tuyere.

(3) *Injection of the hot reformed gases after partial combustion into the furnace.*—This must be performed at the level of the critical zone and the final temperature of the injected gas is preferably at least 150° C. above the temperature of the descending charge materials at the point of injection. The critical temperature zone and the gas injection level are situated near the mantle, which means that in many cases the height of the bosh can advantageously be decreased. In order to obtain the best distribution of the injected gases, particularly when the hearth diameter is over 15 feet, such injection is performed in the same way as the blowing of the air into the hearth, except, that the speed and penetration of the gas entering the critical zone should be somewhat higher.

(4) *Oxygen-enrichment of the blast.*—The external supply of a supplementary gas mixture, $mCO+nH_2$, renders the equilibrium of the preparation zone relatively independent, as to sensible heat and reducing power of the gases, of the weight of carbon burned at the tuyeres. Consequently, this weight of carbon can be reduced to the extent of the sensible heat which can be compensated for in the thermal balance of the melting zone by oxygen-enrichment of the blast. Such enrichment allocates an increased proportion of the heat of combustion to the melting zone. If the blast velocity is increased so as to move the centers of primary combustion to $CO_2$ further into the hearth, a 50% oxygen enrichment of the blast can be considered as the maximum limit with the proper amount of gas injection and the correct blast temperature. This will permit a minimum .330–.375 coke ratio corresponding to a .210–.250 carbon ratio for combustion at the tuyeres under high pressure operation. On this basis the blast temperature can be regulated to fit the heat balance of the melting zone by means of the method of calculation referred to above. It is emphasized that only in combination with natural gas injection as stipulated under (1) to (3), can oxygen enrichment of the blast prove technically and economically feasible. Furthermore, the use of the process is justified economically only when the charge has been chemically and physically conditioned and prepared according to the best modern tehniques.

The apparatus required for conducting the method of this invention using natural gas includes heaters for preheating the natural gas, a bustle pipe encircling the furnace near the mantle, and a specially designed set of tuyeres with which the oxygen-reforming and injecting operations are carried out.

The apparatus required for conducting the method of this invention using fuel oil is even simpler. For example, if Bunker C oil is used, it is preheated as a liquid to approximately 100° C. and piped directly to specially designed burners located around the furnace near the mantle. The number of burners should preferably be the same as the number of tuyeres in the hearth, and these burners should be staggered with respect to the tuyeres. The oxygen required for reformation of the oil is supplied to the burners, the partial combustion taking place there ensuring that material actually injected into the furnace is at or near the required temperature in a gaseous state. The amount of heat liberated by the reforming reaction with the oxygen is such that in some cases a small amount of steam has to be supplied the burner with the oxygen so that the temperature of the injected gases does not too greatly exceed the required injection temperature which should ordinarily be kept in the range of critical zone temperature plus 150°–200° C.

Although several species of the invention have been disclosed hereby, it is to be understood that the invention is not limited thereby, but is susceptible of changes within the scope of the appended claims. In the following claims the term "critical zone" refers to that zone in which the average temperature of the descending materials lies between about 1150° C. and about 1400° C. Furthermore, the word "reforming" hereinafter refers to the combined cracking and partial oxidation of the carbon content of hydrocarbon materials to produce CO and $H_2$, while the term "oxygen-reformed hydrocarbon gases" refers to reforming with oxygen-enriched air or with substantially pure oxygen. "Substantially pure oxygen" means an atmosphere containing not less than 70% oxygen.

I claim:

1. In a blast furnace operation of the classic countercurrent type in which solid ore, flux and carbonaceous fuel are charged into the top and form a descending current of material undergoing a continuous and progressive chemical transformation and increase in temperature until it reaches the level and temperature of slag formation in the charged material, beneath which level the body of charged material is wholly in the molten state, except remaining carbonaceous fuel, becomes superheated, and the molten metal and molten slag are separated by gravity and separately withdrawn, and in which a combustion-supporting blast is admitted near the bottom to form an ascending gas stream decreasing in temperature, the improvement characterized by modification of the ascending gas stream from classic practice carried on simultaneously at two levels, one modification being at the blast admission level and comprising increasing the amount of heat available from the ascending gas stream at temperatures above the critical temperature in proportion to the weight of carbon burned adjacent said admission level, and the other modification being at the critical zone and comprising the injection of oxygen-reformed hydrocarbon material into the ascending gas stream at a temperature above the temperature of the descending material at the injection level, whereby the proportion of fuel to ore in the descending current can be reduced from classic practice and the output of a given furnace increased.

2. In a blast furnace operation of the classic reduction-smelting countercurrent type in which solid comminuted ore, fuel and flux are charged into the top and form a descending current of material undergoing a continuous and progressive chemical transformation and increase in temperature until it reaches the level and temperature of slag formation in the charged material beneath which level the body of charged material is wholly in the molten state, except remaining fuel, becomes superheated, and the molten metal and molten slag are separated by gravity and separately withdrawn, and in which a heated blast of a combustion-supporting atmosphere is admitted at the hearth tuyeres and forms an ascending current of hot reducing gases decreasing in temperature into which ascending current pass combustion products from the fuel and reduction-reaction products from the ore, the improvement characterized by modification of the ascending current from classic practice for a given ore charging rate carried on simultaneously at two levels, one modification being at the hearth tuyere level and comprising increasing the heat available from the ascending current below the critical zone and the other modification being at the critical zone and comprising the injection of oxygen-reformed hydrocarbon material into the ascending current at a temperature above the temperature of the descending material at the injection level, whereby the proportion of fuel to ore in the descending current can be reduced from classic practice and the output of a given furnace increased.

3. The improvement of claim 1 in which the temperature of the injection at the critical zone is between 1350° C. and 1600° C.

4. The improvement of claim 1 in which the injection at the critical zone is prepared by preheating gaseous hydrocarbon material to a maximum temperature of 725° C. and then reformed with substantially pure oxygen.

5. The improvement of claim 4 in which the oxygen used for reforming is separately preheated.

6. The improvement of claim 1 in which the injection at the critical zone is prepared by preheating a liquid hydrocarbon to a maximum temperature of 150° C. and then reformed with substantially pure oxygen.

7. The improvement of claim 1 in which the blast furnace is operated at a top pressure between 0.25 and 2.5 atmospheres gage.

8. The improvement of claim 1 in which the modification at the hearth tuyere level comprises oxygen enrichment of the blast.

References Cited in the file of this patent

UNITED STATES PATENTS

| | | |
|---|---|---|
| 342,607 | Kendall | May 25, 1886 |
| 1,744,213 | Davis | Jan. 21, 1930 |
| 2,192,885 | Avery | Mar. 12, 1940 |
| 2,420,398 | Kinney | May 13, 1947 |
| 2,577,730 | Benedict et al. | Dec. 11, 1951 |